(12) United States Patent
Quinn et al.

(10) Patent No.: US 6,634,827 B2
(45) Date of Patent: Oct. 21, 2003

(54) CAN DÉTENTE

(75) Inventors: Kimberly Quinn, Kenansville, NC (US); Thomas Hogan, Marietta, GA (US)

(73) Assignee: Prima Tech USA, Inc., Powder Springs, GA (US)

(*) Notice: Subject to any disclaimer, the term of this patent is extended or adjusted under 35 U.S.C. 154(b) by 66 days.

(21) Appl. No.: 09/848,495

(22) Filed: May 3, 2001

(65) Prior Publication Data

US 2002/0164206 A1 Nov. 7, 2002

(51) Int. Cl.⁷ .............................................. A47G 29/00
(52) U.S. Cl. ....................... 403/329; 403/426; 222/173; 248/364.04; 248/346.5
(58) Field of Search ................................ 403/326, 329, 403/DIG. 11; 222/173, 402.1; 248/346.04, 346.5, 678

(56) References Cited

U.S. PATENT DOCUMENTS

| | | | | | |
|---|---|---|---|---|---|
| 2,910,219 | A | * | 10/1959 | Bennett et al. | 220/737 |
| 3,266,533 | A | * | 8/1966 | McHale | 141/364 |
| 3,973,774 | A | * | 8/1976 | Breslow et al. | 124/79 |
| 4,043,685 | A | * | 8/1977 | Hyams | 403/19 |
| 5,395,086 | A | * | 3/1995 | Goldstein | 248/346.5 |
| 5,735,373 | A | * | 4/1998 | Klein et al. | 188/321.11 |
| 5,839,846 | A | * | 11/1998 | Shimada et al. | 403/164 |
| 6,089,519 | A | * | 7/2000 | Laybourne | 248/346.11 |
| 6,213,677 | B1 | * | 4/2001 | Yamane et al. | 403/329 |
| 6,279,210 | B1 | * | 8/2001 | Faass et al. | 24/457 |

* cited by examiner

*Primary Examiner*—Anthony Knight
*Assistant Examiner*—Christopher Boswell
(74) *Attorney, Agent, or Firm*—Troutman Sanders LLP; Wm. Brook Lafferty, Esq.; Ryan A. Schneider, Esq.

(57) ABSTRACT

A can détente for attachment to the base of a can is disclosed and claimed. The can détente facilitates attachment of a can to a can carriage and allows the application of force to the bottom of the can from an external source.

3 Claims, 4 Drawing Sheets

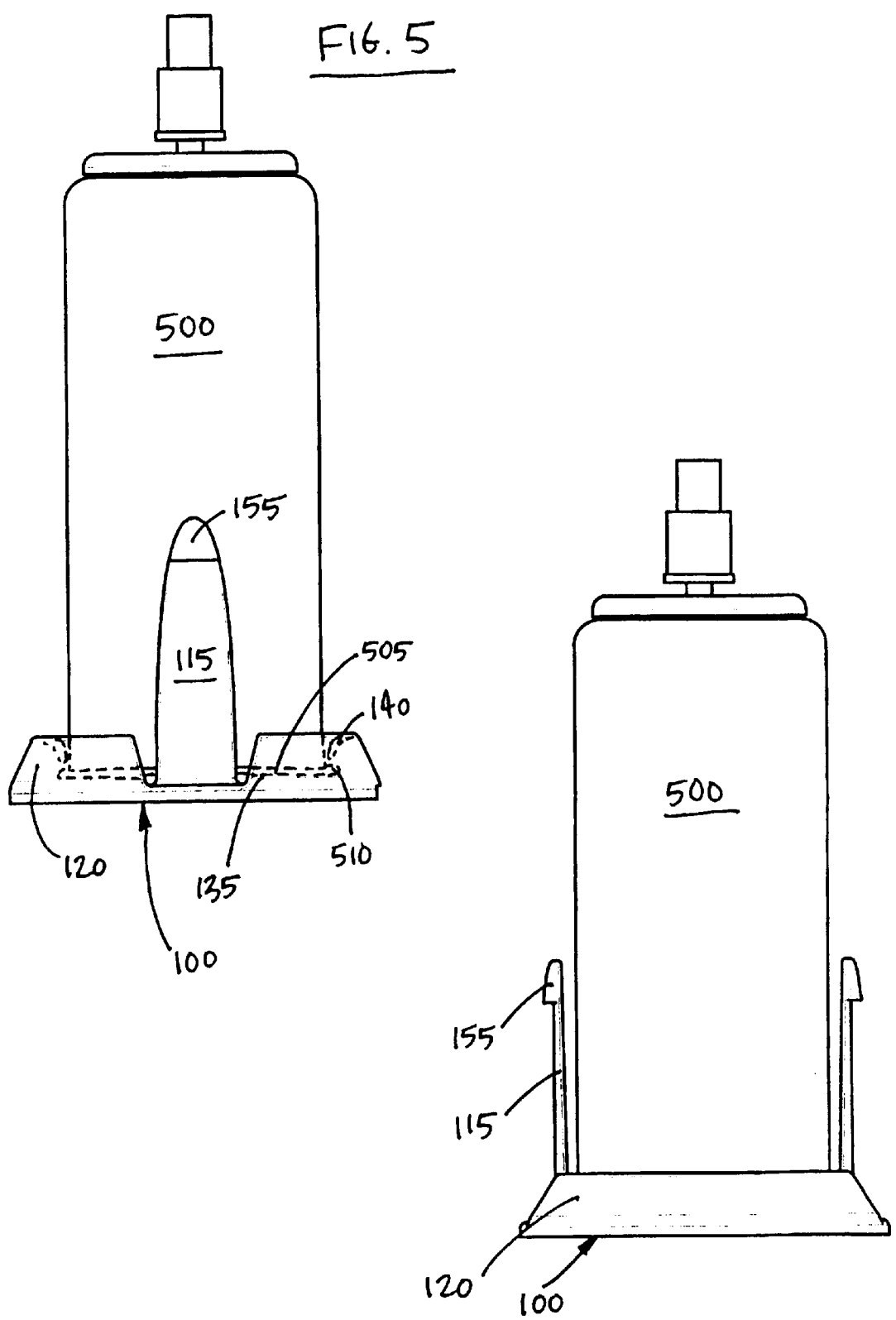

CAN DÉTENTE

TECHNICAL FIELD

The present invention relates to devices for attaching a container such as a can to another object.

BACKGROUND

Situations frequently arise that require a container such as a metal can to be securely attached to another object. A wide variety of attachment mechanisms have been designed to accomplish this objective. For example, the object to which the can is attached may carry a strap to secure the can. Another example, U.S. Pat. No. 6,264,637 to Hogan, entitled "Improved Marking Syringe", depicts a latch integral to the object to which the can is to be attached. In the depicted embodiment, the latch extends along the length of the can and a hook at the distal end of the latch retains the can in a can carriage.

Each of these can détente mechanisms presents deficiencies that limit the effectiveness of their implementation. The strap configuration is limited by the ability of a strap wrapped about the body of the can to hold the can securely in place, especially during exertion of force on one end of the can or another.

The latch configuration is integral to the objects the can is being affixed to, so that when the latch breaks (as plastic latches tend to do), the object itself is most likely rendered useless. In the example depicted in the '637 patent reference above, the latch is integral to a marking syringe. The marking syringe is often used in cold, inhospitable climates, making the plastic from which it was molded relatively brittle. As the latch is bent time after time to release a spent can and replace it with a full can, the latch will fatigue and fail much sooner than any other component of the marking syringe.

Accordingly, there is a need for a can detente that will hold a can in a secure, predetermined position during exertion of external force on the can, such as during rigorous processing of food animals in less than ideal conditions.

There is another need for a can détente that will not endanger the functionality of the object to which the can is attached by repeated installation of cans thereto and the repeated removal of cans therefrom.

BRIEF SUMMARY OF THE INVENTION

The objects stated above are obtained by a novel can détente comprising a circular locking disk having a circular disk body The circular disk body has a disk thickness and, optionally, defines therethrough a disk tab. The circular disk body also defines—about its periphery—a disk shoulder having a shoulder thickness greater than the disk thickness.

The communication between the disk shoulder and the circular disk body defines a can seat. The disk shoulder further defines, proximal to the can seat, a seat latch for securely detaining an object such as a paint can.

An embodiment of the present invention incorporates at least one carriage latch. Each carriage latch is characterized by a first end and a second end, the first end of which is integrally formed to the circular locking disk and extends in a plane generally perpendicular to the circular locking disk. The second end of the carriage latch defines a latch hook for securely—and removably—attaching the can detente to a can carriage.

BRIEF DESCRIPTION OF THE DRAWINGS

FIG. 5 depicts a view of an embodiment of the present invention in which the present invention is attached to a can.

FIG. 6 depicts another view of an embodiment of the present invention in which the present invention is attached to a can.

DETAILED DESCRIPTION OF EXEMPLARY EMBODIMENTS

Figure 1:
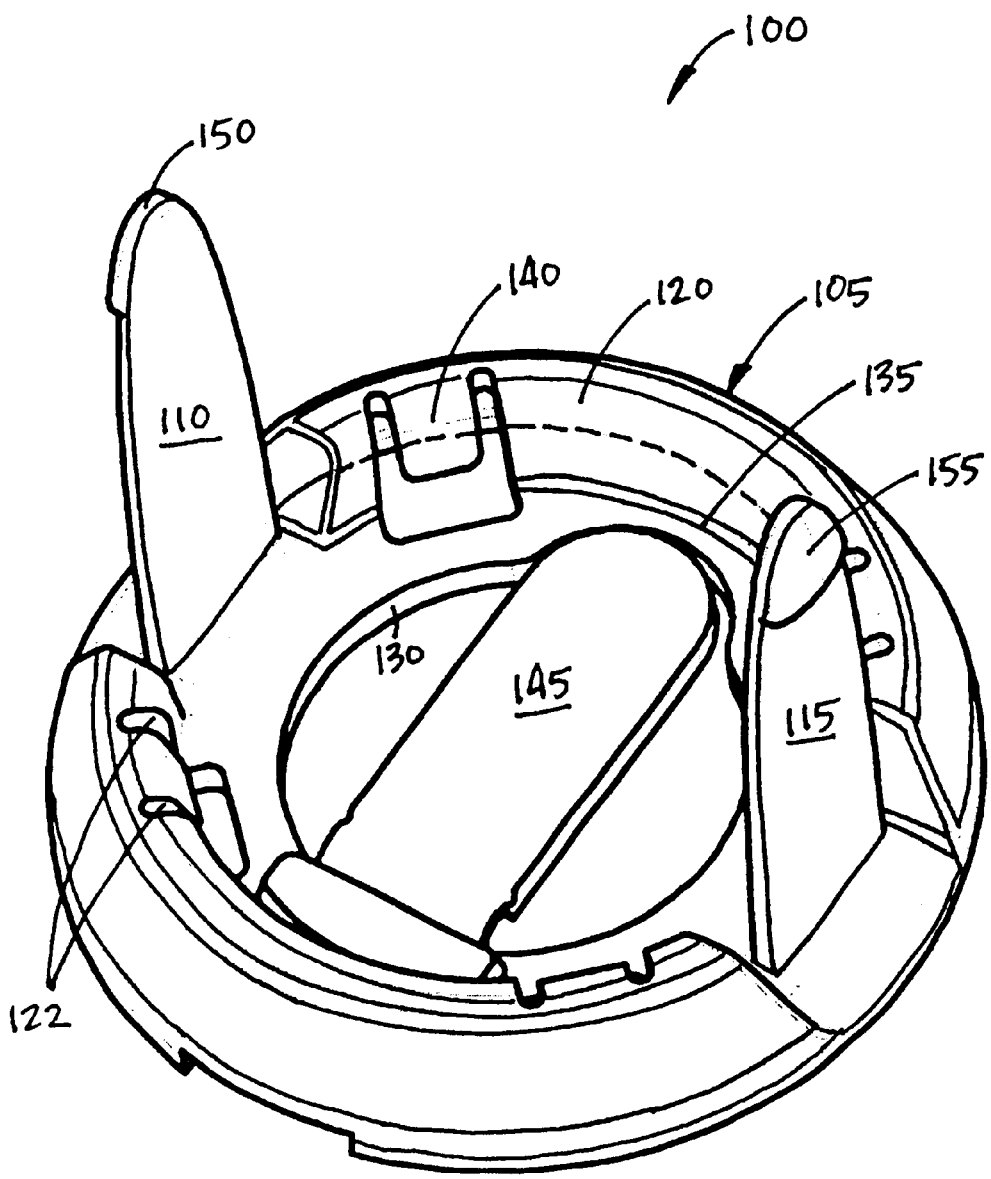
FIG. 1 depicts a perspective view of an embodiment of the present invention.

FIG. 1 depicts a perspective view of an exemplary embodiment of the present invention. The depicted embodiment of the can détente 100 comprises, generally, a circular locking disk 105 and two carriage latches 110, 115.

In terms of composition, the can détente 100 is normally formed of plastic or a plastic variant such that it exhibits a high degree of resiliency while maintaining a lesser degree of flexibility as will be called for in implementation of the invention. More specifically, once the can détente 100 is attached to the base of a can in the manner later described, the material from which the can détente 100 is fabricated must be resilient enough to maintain itself in its interlocked state with the can. At the same time, certain aspects of the can détente 100, such as the latch hooks, 110, 115, and the disk tab 145 must be flexible enough to withstand a moderate amount of bending. Furthermore, the can détente 100 must be constructed of a material that will retain these important properties in particularly hostile climates, such as extreme cold temperatures such as those in which many food animal herds are reared. It will be understood and appreciated that materials other than plastic or plastic derivatives or compounds may also be used, so long as they demonstrate the performance characteristics described above.

In the depicted embodiment, the circular locking disk 105 includes a disk shoulder 120 and a circular disk body 125. The circular disk body 125 is a generally planar surface having a disk thickness 130. The disk shoulder 120 is attached to the circular disk body 125 at or proximal to the outer perimeter of the circular disk body 125. The disk shoulder 120 generally extends about the entire periphery of the circular locking disk 125, with the exception of portions of the periphery such as those to which latches such as carriage latches 110, 115 are attached to the circular disk body 125, thereby forming a can seat 135. Ideally, the can seat 135 is sized to accommodate the base of a can (not depicted).

Although the depicted embodiment represents a preferred configuration of the disk shoulder 120, it will be understood that the disk shoulder 120 could effectively accomplish its functionality (later described) without extending about as much of the outer periphery of the circular locking disk 125 as shown.

At two or more locations about the inside periphery of the disk shoulder 120, shoulder tabs 140 are defined. Each shoulder tab is integrally formed with the disk shoulder 120 at a first end, but—unlike other points about the inner periphery of the disk shoulder 120—does not connect with the circular disk body 125. As a result, when force is exerted upon a shoulder tab 140, the shoulder tab 140 tends to bend in the direction dictated by the force. When, for instance, a can having an outside diameter roughly equal to the inner dimension of the disk shoulder 120 is inserted into the disk shoulder 120, the shoulder tab 140 will yield to the pressure more readily than the portion of the disk shoulder connected to the circular disk body. Because the leading end of the can is likely to have a protruding lip about its periphery, as the lip passes the unconnected end of the shoulder tab 140, the resiliency of the shoulder tab 140 urges it back into communication with the can itself, thereby "locking" the can détente about the lip of the can.

Another feature of a preferred embodiment of the present invention is the disk tab 145. The disk tab 145 is integrally attached at one end to the circular disk body 125, and is unattached at its other end. As previously described with reference to desired construction materials for the can détente 100, the disk tab 145 is flexible enough to pivot about its attachment to the circular disk body 125 in response to a force being exerted against it. When a can is seated in the can seat 135 of the can detente 100, and a force is applied to the disk tab 145 from the opposite side of the can détente 100 to which the can is attached, the disk tab 145 is urged against the bottom of the can. This action by a force against the disk tab 145 and then against the can may actuate discharge of the contents of the can in the manner later described.

Another feature of the depicted embodiment of the present invention are the carriage latches 110, 115. The carriage latches 110, 115 are integrally formed with the circular disk body 125 or the disk shoulder 120 of the can détente 100 and extend in a plane generally perpendicular to the circular disk body 125. Proximal to the end of the carriage latch 110, 115, a latch hook, 150, 155 is defined. The latch hook may be any of a wide variety of designs, so long as the latch hook allows easy insertion of the latch hook 150, 155 into a hook catch of a can carriage, later described in detail.

Figure 2:
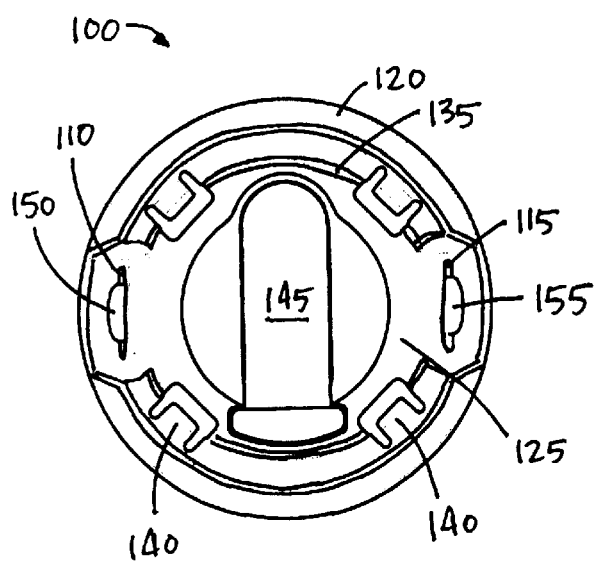
FIG. 2 depicts a top view of an embodiment of the present invention.

FIG. 2 depicts a top view of a preferred embodiment of the present invention. The can détente 100 comprises, as previously described, a circular disk body 125 and a disk shoulder 120, the inner communication therebetween defining a can seat 135. A plurality of shoulder tabs 140 are defined by the disk shoulder 120 for retaining a can securely within the can seat 135. The disk tab 145 allows force external to the can détente 100 to be exerted on the bottom of the can, while carriage latches 110, 115 and latch hooks 150, 155 retain the can détente 100 in fixed relation to a can carriage (not shown).

Figure 3:
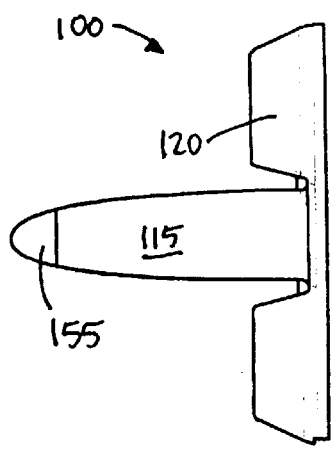
FIG. 3 depicts a side view of an embodiment of the present invention.

FIG. 3 depicts a side profile of an embodiment of the can détente 100, particularly illustrating the disk shoulder 120, carriage latch 115 and latch hook 155.

Figure 4:
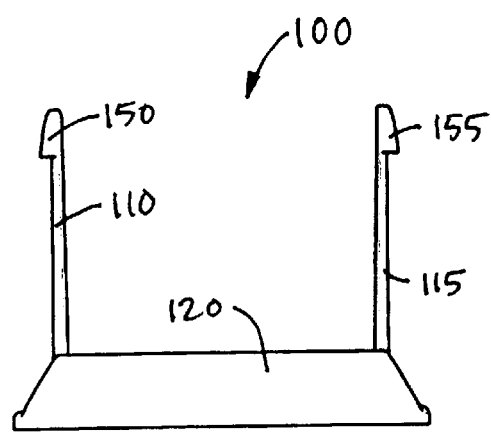
FIG. 4 depicts another side view of an embodiment of the present invention.

FIG. 4 depicts another side profile of an embodiment of the can détente 100, rotated 90 degrees from the profile view of FIG. 3. FIG. 4 illustrates a representative configuration including the disk shoulder 120, carriage latches 110, 115 and the latch hooks 150, 155.

FIG. 5 depicts an exemplary embodiment of the present invention in an attached configuration. More specifically, the can détente 100 is attached to a can 500. The can 500, and many other similar containers, are constructed so as to have a can rim 505. The purpose of the can rim 505 is to securely interconnect the bottom piece (not shown) of the can 500 to the generally tubular body of the can 500. This interconnection or "crimp" as it is sometimes described results in a can lip 510 having a greater diameter than the diameter of the generally tubular portion of the can 500. As the can 500 and the can détente 100 are urged together, the can lip 510 contacts the disk shoulder 120 about its inner periphery. As the urging force is increased, the flexible but resilient disk shoulder 120 yields to the pressure and expands to the diameter of the can lip 510. As the urging force continues, the can lip 510 passes the bottom-most point of the shoulder tab(s) 140. As the can lip 510 passes the bottom most point of the shoulder tab(s) 140, the resiliency of the shoulder tab(s) 140 urge the shoulder tab(s) 140 into a position resembling the position they were in prior to exertion of force by the can lip 510 thereon. In a preferred embodiment, the shoulder tab(s) then return to a position approximating the diameter of the generally tubular portion of the can 500, which is less than the diameter of the can lip 510, thus holding the can 500 securely in place proximal to the can seat 135.

FIG. 6 depicts another view of an exemplary embodiment of the present invention wherein the can détente 100 has been securely interconnected to the can 500.

Figure 7:
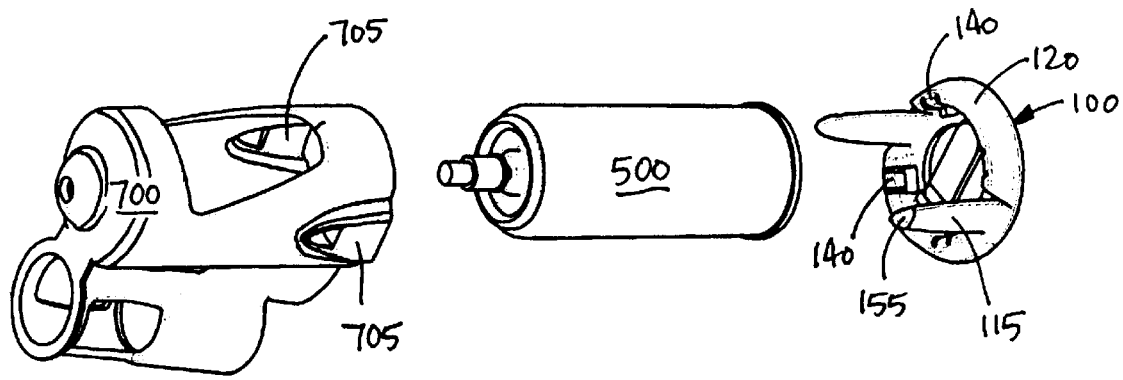
FIG. 7 depicts an exploded assembly in which an embodiment of the present invention attaches a can to a can carriage.

FIG. 7 depicts an exploded view of an exemplary embodiment of the present invention in a representative operating environment. The can détente 100 attaches to the can 500 at the base of the can proximal to the can lip 510. As previously described with reference to FIG. 6, the can lip 510 is secured by communication with the shoulder tab(s) 140. Once the can détente 100 is attached to the base of the can 500, the assembly is inserted into a can carriage such as can carriage 700. The can carriage 700 defines at least one latch receiver 705 corresponding dimensionally to the carriage latch 115 and latch hook 155. After the can/can détente assembly is fully inserted into the can carriage 700, the latch hook 155 interlocks with a corresponding opening in the latch receiver, and the can 500 is securely interconnected to the can carriage 700.

As the contents of the can 500 are exhausted, force may be exerted upon the latch hook 155, thereby disengaging it from the latch receiver 705 for removal from the can carriage 700.

Figure 8:
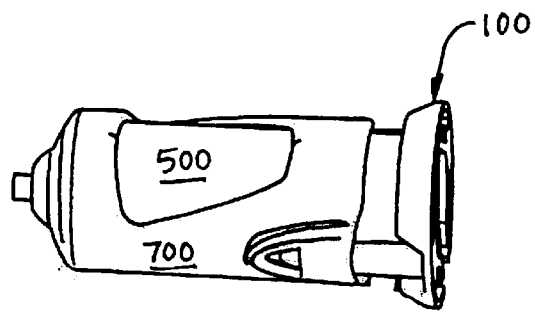
FIG. 8 depicts and assembly in which an embodiment of the present invention attaches a can to a can carriage.

FIG. 8 depicts a representative embodiment of the present invention whereby a can détente 100 is fully engaging a can 500 to a can carriage 700.

We claim:

1. A can détente for attachment to a container, comprising:
   a. a circular locking disk having a circular disk body, the circular disk body having a disk thickness and defining therethrough a disk tab for applying force to the container from an external source, the circular disk body further defining, about its periphery, a disk shoulder having a shoulder thickness greater than the disk thickness, the communication between the disk shoulder and the circular disk body defining a can seat, the disk shoulder further defining, proximal to the can seat, a shoulder tab; and
   b. a carriage latch having a first end and a second end, integrally formed at its first end to the circular locking disk and extending in a plane generally perpendicular to the circular locking disk, the second end of the carriage latch defining a latch hook.

2. A can détente for attachment to a container, comprising:
   a. a circular locking disk having a disk body, the circular disk body having a disk thickness, the disk body further defining, about its periphery, a disk shoulder having a shoulder thickness greater than the disk thickness, the communication between the disk shoulder and the circular disk body defining a can sear, the disk shoulder further defining, proximal to the can seat, a resilient shoulder tab; and b. a carriage latch having a first end and a second end, integrally formed at its first end to the locking disk and extending in a plane generally perpendicular to the locking disk, the second end of the carriage latch defining a latch hook.

3. A can détente far attachment to a container, comprising:

a. a circular locking disk having a circular disk body, the circular disk body having a disk thickness, the circular disk body further defining, about its periphery, a disk shoulder having a shoulder thickness greater than the disk thickness, the communication between the disk shoulder and the circular disk body defining a can seat, the disk shoulder further defining, proximal to the can seal, a resilient shoulder tab; and b. a carriage latch having a first end and a second end, integrally formed at its first end to the circular locking disk and extending in a plane generally perpendicular to the circular locking disk, the second end of the carriage latch defining a latch hook.

* * * * *